(12) United States Patent
Chang

(10) Patent No.: US 11,200,561 B2
(45) Date of Patent: Dec. 14, 2021

(54) NFC SERVICE PROCESSING METHOD, TERMINAL, AND NFC CHIP

(71) Applicant: HUAWEI TECHNOLOGIES CO., LTD., Shenzhen (CN)

(72) Inventor: Xinmiao Chang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 190 days.

(21) Appl. No.: 16/618,515

(22) PCT Filed: Jun. 2, 2017

(86) PCT No.: PCT/CN2017/087006
§ 371 (c)(1),
(2) Date: Dec. 2, 2019

(87) PCT Pub. No.: WO2018/218662
PCT Pub. Date: Dec. 6, 2018

(65) Prior Publication Data
US 2020/0126064 A1 Apr. 23, 2020

(51) Int. Cl.
*G06Q 20/32* (2012.01)
*H04B 5/00* (2006.01)

(52) U.S. Cl.
CPC ....... *G06Q 20/3278* (2013.01); *H04B 5/0037* (2013.01); *H04B 5/0062* (2013.01)

(58) Field of Classification Search
None
See application file for complete search history.

(56) References Cited

U.S. PATENT DOCUMENTS

| | | | |
|---|---|---|---|
| 2012/0178366 A1* | 7/2012 | Levy | H04W 74/06 455/41.1 |
| 2015/0062643 A1 | 3/2015 | Hagiwara | |
| 2016/0227012 A1* | 8/2016 | Chai | H04W 4/80 |
| 2016/0267486 A1* | 9/2016 | Mitra | H04W 12/041 |
| 2018/0102812 A1* | 4/2018 | Wennemer | H02J 7/025 |
| 2018/0109291 A1 | 4/2018 | Peng et al. | |
| 2018/0130548 A1* | 5/2018 | Fisher | G16H 10/65 |

FOREIGN PATENT DOCUMENTS

| | | |
|---|---|---|
| CN | 101841604 A | 9/2010 |
| CN | 101916950 A | 12/2010 |
| CN | 102075598 A | 5/2011 |
| CN | 102209129 A | 10/2011 |

(Continued)

*Primary Examiner* — Kristy A Haupt
(74) *Attorney, Agent, or Firm* — Rimon PC

(57) ABSTRACT

A method is applied to a first terminal, the first terminal includes a main processor and an NFC chip, and a first SE is integrated into and/or an HCE application is run on the main processor. The method includes: when the main processor of the first terminal is powered off, receiving, by the first terminal, an application selection instruction sent by a second terminal, where the application selection instruction is used to instruct to process an NFC service by using an application in the first SE or the HCE application; and after receiving the application selection instruction, controlling, by the first terminal, the main processor to be powered on, and routing the application selection instruction to the main processor, so that the main processor processes the NFC service.

20 Claims, 10 Drawing Sheets

(56) References Cited

FOREIGN PATENT DOCUMENTS

| | | |
|---|---|---|
| CN | 102968864 A | 3/2013 |
| CN | 203643943 U | 6/2014 |
| CN | 105550870 A | 5/2016 |
| WO | 2016081013 A1 | 5/2016 |
| WO | 2016183736 A1 | 11/2016 |

* cited by examiner

NFC SERVICE PROCESSING METHOD, TERMINAL, AND NFC CHIP

CROSS-REFERENCE TO RELATED APPLICATIONS

This application is a national stage of International Application No. PCT/CN2017/087006, filed Jun. 2, 2017, which is hereby incorporated by reference in its entirety.

TECHNICAL FIELD

This application relates to the field of terminal technologies, and in particular, to an NFC service processing method, a terminal, and an NFC chip.

BACKGROUND

Near field communication (NFC) technologies evolve from integrated non-contact radio frequency identification (RFID) and interconnection and interworking technologies. Functions of an induction card reader and an induction card and a point-to-point function are combined on a single chip, which can identify other devices supporting an NFC function and exchange data within a short distance. Currently, more terminals are provided with the NFC function. A mobile phone is used as an example. A mobile phone provided with the NFC function may be used in check-in verification at an airport, and used as a door access key, and may further implement card simulation, for example, be used as an all-in-one traffic card, a credit card, a payment card, and the like to process an NFC service.

When a mobile phone provided with the NFC function implements card simulation, currently, two implementations are provided: One is based on hardware and is referred to as a virtual card mode, and the other is based on software and is referred to as a host card mode.

In the virtual card mode, the mobile phone needs to provide a security element (SE), to securely store sensitive information and provide a secure execution environment for a transaction. Currently, the SE exists in a mobile phone in these forms: integrated into a subscriber identification module (SIM) card referred to as a SIM-SE; integrated into a main processor referred to as an inSE; or used as a separate chip referred to as an eSE. In the virtual card mode, an NFC chip forwards commands or data received from an external reader, to the SE for processing, and the NFC chip interacts with the external reader.

In the host card mode, the mobile phone does not need to provide an SE, and instead, a host-based card emulation (HCE) application running in the mobile phone or a cloud server completes the function of the SE. In such a mode, the NFC chip sends, to the HCE application in the mobile phone, commands or data received from an external reader, or sends the commands or the data to a cloud server over a mobile network to complete interaction.

In the prior art, when an inSE is integrated into the main processor in the mobile phone or an HCE application is installed on the mobile phone, and the terminal is powered off, the inSE or the HCE application cannot work, and for this reason, the terminal cannot process the NFC service by using the inSE or the HCE.

SUMMARY

Embodiments of this application provide an NFC service processing method, a terminal, and an NFC chip, to resolve a problem existing in the prior art that when the terminal is powered off, an inSE or an HCE application cannot work, and for this reason, the terminal cannot process an NFC service by using the inSE or the HCE.

According to a first aspect, an NFC service processing method is provided. The method is applied to a first terminal, the first terminal includes a main processor and an NFC chip, and a first SE is integrated into and/or an HCE application is run on the main processor. The NFC service processing method includes: when the main processor of the first terminal is powered off, receiving, by the first terminal, an application selection instruction sent by a second terminal, where the application selection instruction is used to instruct to process an NFC service by using an application in the first SE or the HCE application; after receiving the application selection instruction, controlling, by the first terminal, the main processor to be powered on; and then routing, by the first terminal, the application selection instruction to the main processor, so that the main processor processes the NFC service.

According to the foregoing method, when the first terminal receives the application selection instruction that is sent by the second terminal and that is used to instruct the first terminal to process the NFC service by using the application in the first SE or the HCE application, the first terminal controls the main processor to be powered on. In this case, after the main processor is powered on, the SE in the main processor or the HCE application run on the main processor can process the NFC service. Therefore, according to the foregoing method, even if the SE is integrated into the main processor or the HCE application is installed on the main processor, the terminal can power on and wake up the main processor in a turn-off state, so that the SE integrated into the main processor or the HCE application run on the main processor can normally work to complete processing of the NFC service.

In an implementation of the first aspect, the first terminal further includes a second SE, and the second SE and the main processor are independently configured. Then, before the controlling, by the first terminal, the main processor to be powered on, the method further includes: determining, by the first terminal, whether an application identifier AID carried in the application selection instruction is an AID in a preset AID set, and if the AID is an AID in the preset AID set, controlling, by the first terminal, the main processor to be powered on. The preset AID set includes an AID of the application installed on the first SE and/or an AID of the HCE application.

In an implementation of the first aspect, before the controlling, by the first terminal, the main processor to be powered on, the method further includes: sending, by the first terminal, a time extension instruction to the second terminal, where the time extension instruction carries to-be-extended duration, and the time extension instruction is used to instruct the second terminal to increase waiting duration for communication, and the increased waiting duration is the to-be-extended duration.

In an implementation of the first aspect, the controlling, by the first terminal, the main processor to be powered on includes: determining, by the first terminal, a current battery level; and if the current battery level is greater than a threshold, powering on and waking up, by the first terminal, the main processor in a first clock sequence; or if the current battery level is less than the threshold, powering on and waking up, by the first terminal, the main processor in second clock sequence. The first clock sequence is a turnon-to-power-on sequence, and the second clock sequence is used to wake up only a module that is used to process the NFC service.

In an implementation of the first aspect, after the routing, by the first terminal, the application selection instruction to the main processor, the method further includes: when the first terminal has processed the NFC service, prompting, by the first terminal, a user that the NFC service has been processed.

In an implementation of the first aspect, after the routing, by the first terminal, the application selection instruction to the main processor, the method further includes: when the first terminal has processed the NFC service, determining, by the first terminal, the current battery level; and if the current battery level is greater than the threshold, prompting, by the first terminal, the user whether to turn off the first terminal; or if the current battery level is less than the threshold, controlling, by the first terminal, the main processor to be powered off.

According to a second aspect, an NFC service processing method is provided. The method is applied to a first terminal, the first terminal includes a main processor, an NFC chip, and a power management unit (PMU), and a first SE is integrated into and/or an HCE application is run on the main processor. The method includes: when the main processor is powered off, receiving, by the NFC chip, an application selection instruction sent by a second terminal, where the application selection instruction is used to instruct to process an NFC service by using an application in the first SE or the HCE application; then, sending, by the NFC chip a power-on trigger signal to the PMU; controlling, by the PMU based on the power-on trigger signal, the main processor to be powered on; and after the main processor is powered on, routing, by the NFC chip, the application selection instruction to the main processor, so that the main processor processes the NFC service.

In an implementation of the second aspect, the first terminal further includes a second SE, and the second SE and the main processor are independently configured. Then, before the sending, by the NFC chip, a power-on trigger signal to the PMU, the method further includes: determining, by the NFC chip, whether an application identifier AID (AID) carried in the application selection instruction is an AID in a preset AID set; and if the AID is an AID in the preset AID set, sending, by the NFC chip, the power-on trigger signal to the PMU, where the preset AID set includes an AID of the application installed on the first SE and/or an AID of the HCE application.

In an implementation of the second aspect, before the sending, by the NFC chip, a power-on trigger signal to the PMU, the method further includes: sending, by the NFC chip, a time extension instruction to the second terminal, where the time extension instruction carries to-be-extended duration, and the time extension instruction is used to instruct the second terminal to increase waiting duration for communication, and the increased waiting duration is the to-be-extended duration. In this implementation, a process in which the first terminal sends the time extension instruction to the second terminal is added, and after receiving the time extension instruction, the second terminal increases the duration for waiting for a response from the first terminal, so that the first terminal can have sufficient time to stark a power-on process.

In an implementation of the second aspect, the controlling, by the PMU based on the power-on trigger signal, the main processor to be powered on includes: determining, by the PMU, a current battery level; and if the current battery level is greater than a threshold, powering on and waking up, by the PMU, the main processor in a first clock sequence; or if the current battery level is less than the threshold, waking up, by the PMU, the main processor in a second clock sequence, where the first clock sequence is a turn-on-to-power-on sequence, and the second clock sequence is used to wake up only a module that is used to process the NFC service.

In an implementation of the second aspect, after the processing, by the main processor, the NFC service, the method further includes: when the main processor has processed the NFC service, prompting a user that the NFC service has been processed.

In an implementation of the second aspect, after the processing, by the main processor, the NFC service, the method further includes: when the main processor has processed the NFC service, determining, by the main processor, the current battery level; and if the current battery level is greater than the threshold, prompting, by the main processor, the user whether to turn off the first terminal; or if the current battery level is less than the threshold, controlling, by the PMU, the main processor to be powered off.

According to the foregoing method, when the NFC chip of the first terminal receives the application selection instruction that is sent by the second terminal and that is used to instruct the first terminal to process the NFC service by using the application in the first SE or the HCE application, the NFC chip sends the power-on trigger signal to the PMU, and the PMU triggers, based on the power-on trigger signal, the main processor to be powered on. In this case, after the main processor is powered on, the SE in the main processor or the HCE application run on the main processor can process the NFC service. Therefore, according to the foregoing method, even if the SE is integrated into the main processor or the HCE application is installed on the main processor, the terminal can power on and wake up the main processor in a turn-off state, so that the SE integrated into the main processor or the HCE application run on the main processor can normally work to complete processing of the NFC service.

According to a third aspect, a terminal is provided. The terminal is used as a first terminal and includes a near field communication NFC chip, a power management unit PMU, and a main processor, and a first security element SE is disposed in or a host-based card emulation HCE application is run on the main processor. The NFC chip is configured to: when the main processor is powered off, receive an application selection instruction sent by a second terminal, where the application selection instruction is used to instruct to process an NFC service by using an application in the first SE or the HCE application. The NFC chip is further configured to send a power-on trigger signal to the PMU. The PMU is configured to power on and wake up the main processor based on the power-on trigger signal sent by the NFC chip. The NFC chip is further configured to route the application selection instruction to the main processor. The main processor is configured to process the NFC service.

In an implementation of the third aspect, the first terminal further includes a second SE, and the second SE and the main processor are independently configured. The NFC chip is further configured to: determine whether an application identifier AID carried in the application selection instruction is an AID in a preset AID set; and when the AID is an AID in the preset AID set, send the power-on trigger signal to the PMU, where the preset AID set includes an AID of the application installed on the first SE and/or an AID of the HCE application.

In an implementation of the third aspect, the NFC chip is further configured to send a time extension instruction to the second terminal, where the time extension instruction carries to-be-extended duration, and the time extension instruction is used to instruct the second terminal to increase waiting duration for communication, and the increased waiting duration is the to-be-extended duration.

In an implementation of the third aspect, the PMU is further configured to: determine a current battery level; and when the current battery level is greater than a threshold, power on and wake up the main processor in a first clock sequence; or when the current battery level is less than the threshold, power on and wake up the main processor in a second clock sequence, where the first clock sequence is a turn-on-to-power-on sequence, and the second clock sequence is used to wake up only a module that is used to process the NFC service.

In an implementation of the third aspect, the main processor is further configured to: when having processed the NFC service, prompt a user that the NFC service has been processed.

In an implementation of the third aspect, the main processor is further configured to: when having processed the NFC service, determine the current battery level; and when the current battery level is greater than the threshold, prompt the user whether to turn off the first terminal; or when the current battery level is less than the threshold, control the main processor to be powered off.

According to the first terminal, when the NFC chip of the first terminal receives the application selection instruction that is sent by the second terminal and that is used to instruct the first terminal to process the NFC service by using the application in the first SE or the HCE application, the NFC chip sends the power-on trigger signal to the PMU, and the PMU triggers, based on the power-on trigger signal, the main processor to be powered on. In this case, after the main processor is powered on, the SE in the main processor or the HCE application run on the main processor can process the NFC service. Therefore, according to the foregoing method, even if the SE is integrated into the main processor or the HCE application is installed on the main processor, the terminal can power on and wake up the main processor in a turn-off state, so that the SE integrated into the main processor or the HCE application run on the main processor can normally work to complete processing of the NFC service.

According to a fourth aspect, an NFC chip is provided. The NFC chip is located in a first terminal, the first terminal further includes a main processor and a PMU, and a first security element SE is integrated into and/or a host-based card emulation HCE application is run on the main processor. The NFC chip is configured to receive an application selection instruction sent by a second terminal, where the application selection instruction is used to instruct to process an NFC service by using an application in the first SE or the HCE application. The NFC chip is further configured to: determine whether the main processor is powered off; and when the main processor is powered off, send a power-on trigger signal to the PMU, so that the PMU powers on and wakes up the main processor based on the power-on trigger signal. The NFC chip is further configured to route the application selection instruction to the main processor, so that the main processor processes the NFC service.

In an implementation of the fourth aspect, the NFC chip is further configured to: when the first terminal further includes a second SE, determine whether an application identifier AID carried in the application selection instruction belongs to a preset AID set; and when the AID belongs to the preset AID set, send the power-on trigger signal to the PMU. The second SE and the main processor are independently configured.

In an implementation of the fourth aspect, the NFC chip is further configured to send a time extension instruction to the second terminal, where the time extension instruction carries to-be-extended duration, and the time extension instruction is used to instruct the second terminal to increase waiting duration for communication, and the increased waiting duration is the to-be-extended duration.

According to the NFC chip, when the application selection instruction that is sent by the second terminal and that is used to instruct the first terminal to process the NFC service by using the application in the first SE or the HCE application is received, the NFC chip sends the power-on trigger signal to the PMU, so that the PMU triggers, based on the power-on trigger signal, the main processor to be powered on. In this case, after the main processor is powered on, the SE in the main processor or the HCE application run on the main processor can process the NFC service. Therefore, according to the foregoing method, even if the SE is integrated into the main processor or the HCE application is installed on the main processor, the NFC chip can power on and wake up the main processor in a turn-off state, so that the SE integrated into the main processor or the HCE application running on the main processor can normally work to complete processing of the NFC service.

According to a fifth aspect, a computer readable storage medium is provided, where the computer readable storage medium stores an instruction, and the instruction, when run on a computer, enables the computer to perform the method according to the first aspect.

According to a sixth aspect, a computer program product is provided, where the computer program product includes an instruction, and the instruction, when run on a computer, enables the computer to perform the method according to the first aspect.

DESCRIPTION OF EMBODIMENTS

Figure 1A:
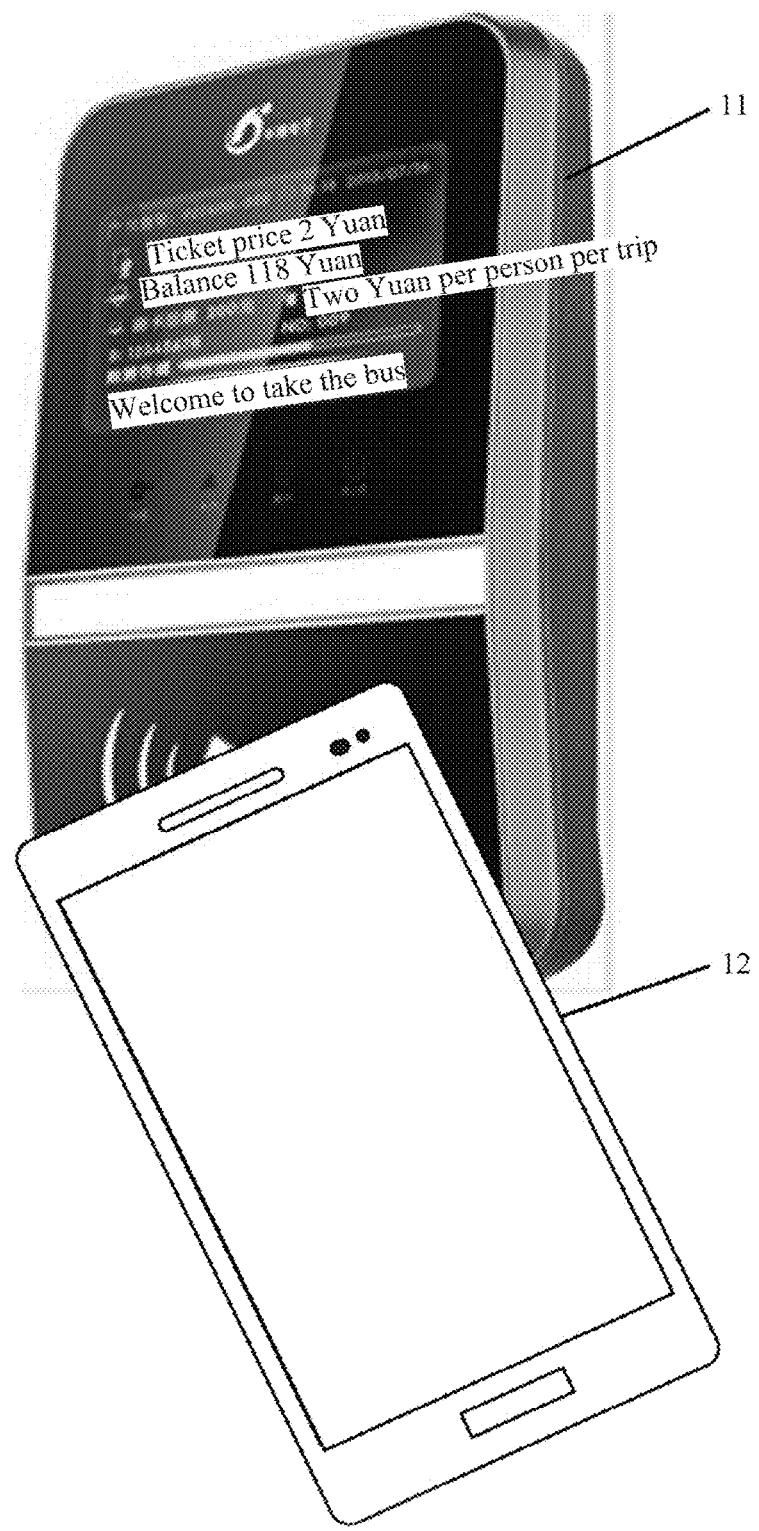
FIG. 1a and FIG. 1b are schematic diagrams of application scenarios of an NFC service.
Figure 1B:
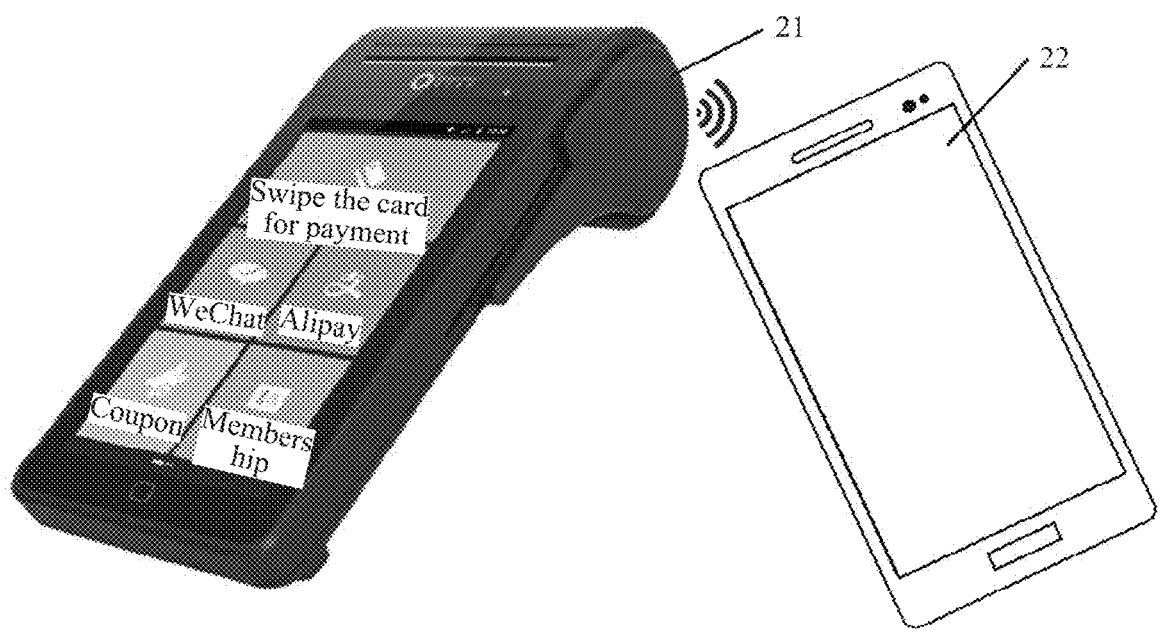

Currently, processing of an NFC service, due to its convenience, is widely applied to scenarios such as swiping a card for payment and identity authentication. As shown in FIG. 1a, when a bus card reader supports an NFC function, a user may touch the bus card reader 11 by using a mobile phone 12 supporting the NFC function, to make a payment by swiping a card. As shown in FIG. 1b, when a POS terminal in a store supports the NFC function, the user may alternatively touch the POS terminal 21 by using a mobile phone 22 supporting the NFC function, to make a payment by swiping a card. In other application scenarios, when an intelligent automobile supports the NFC function, a mobile phone supporting the NFC function may be used as an automobile key, and when approaching the intelligent automobile, the mobile phone performs NFC interaction with the intelligent automobile, to open a door of the automobile. In such scenarios, the mobile phone is emulated as a "bank card", a "bus card", and an "automobile key", to implement a payment by swiping a card or start the intelligent automobile by swiping a card.

With reference to the application scenario in FIG. 1a or FIG. 1b, an embodiment of this application provides a terminal supporting an NFC function. The terminal may be a mobile phone, a tablet computer, a notebook computer, a super mobile personal computer, a netbook, a personal digital assistant, a wearable device, and the like.

Figure 2:
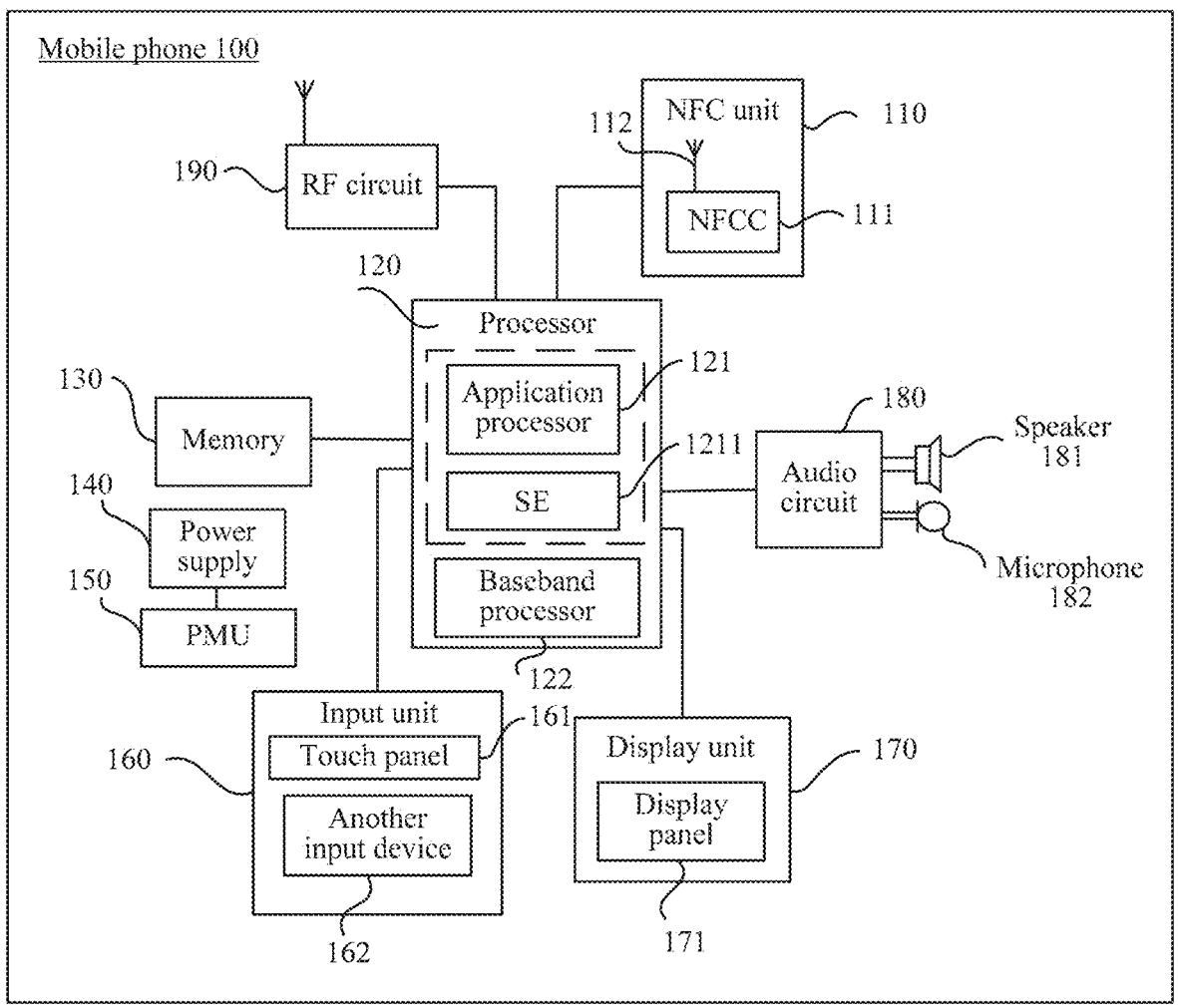
FIG. 2 is a schematic structural diagram of a mobile phone.

For example, the terminal supporting the NFC function is a mobile phone. As shown in FIG. 2, a mobile phone 100 includes components such as: an NFC chip 110, a main processor 120, a memory 130, a power supply 140, a PMU 150, an input unit 160, a display unit 170, an audio circuit 180, and a radio frequency circuit 190. A person skilled in the art may understand that a structure of the mobile phone shown in FIG. 2 does not constitute a limitation on the mobile phone, and the mobile phone may include more or fewer components than those shown in the figure, or some components may be combined, or different component arrangements may be used.

The functional components of the mobile phone 100 are described below:

The NFC chip 110 includes an NFC controller (NFCC) 111 and a radio frequency antenna 112, whose functions include modulating and demodulating a radio frequency signal and processing an NFC protocol. The NFCC 111 is connected to the radio frequency antenna 112 to send and receive signals of 13.56 MHz, and communicates with an SE.

Optionally, the SE in the mobile phone may be integrated into the main processor 120, located on a subscriber identification module (SIM) card of the mobile phone, located on a secure digital memory card (SD) of the mobile phone, or may be an independent chip.

The main processor 120 is a control center of the mobile phone 100, and is connected to respective parts of the mobile phone by using various interfaces and lines. By running or executing the software program and/or the module stored in the memory 130, and invoking data stored in the memory 130, the main processor 120 performs various functions and data processing of the mobile phone 100, thereby performing overall monitoring on the mobile phone. Optionally, the main processor 120 may include one or more processing units. Optionally, as shown in FIG. 2, the main processor 120 is integrated with an application processor (AP) 121 and a baseband processor (BP) 122. The application processor 121 mainly processes an operating system, a user interface, an application program, and the like. Optionally, as shown in FIG. 2, the application processor 121 is integrated with an SE 1211. The baseband processor 122 mainly processes wireless communication. It may be understood that the baseband processor 122 may not be integrated into the main processor 120.

It should be noted that, the main processor 120 described in the embodiments of this application may be specifically a system on chip SoC (SoC), or may be a central processing unit (CPU). For a specific implementation of the SOC and CPU, refer to the prior art, and details are not described herein.

The memory 130 may be configured to store a software program and a module. The main processor 120 runs the software program and the module stored in the memory 130, to perform various functional applications and data processing of the mobile phone 100. The memory 130 may mainly include a program storage area and a data storage area. The program storage area may store an operating system, an application program required by at least one function (such as a sound playing function and an image display function), and the like. The data storage area may store data (such as audio data, image data, and an address book) created based on use of the mobile phone, and the like. In addition, the memory 130 may include a high-speed random access memory, and may further include a non-volatile memory, such as at least one magnetic disk storage device, a flash memory device, or another volatile solid-state storage device.

The mobile phone 100 further includes the power supply 140 (such as a battery) for supplying power to the components and the PMU 150. The PMU 150 is a highly integrated power management solution for portable devices. That is, several types of conventional disparate power management chips, such as a low dropout regulator (LDO) and a DC converter (DC/DC), are integrated into a PMU of a mobile phone. In this way, board space can be correspondingly minimized, thereby improving efficiency and reducing costs. A trigger condition of the PMU is that a press on a power button is detected. The power button is connected to a pin of the PMU, and the press on the power button generates a signal to the PMU, so that the PMU gradually controls the power supply 140 to power on modules such as the processor, the display unit, and the input unit in a predetermined clock sequence.

The input unit 160 may be configured to receive input digit or character information, and generate a key signal input related to a user setting and function control of the mobile phone 100. Specifically, the input unit 160 may include a touchscreen 161 and another input device 162. The touchscreen 161, which is also referred to as a touch panel, may collect a touch operation of a user on or near the touchscreen (such as an operation of a user on or near the touchscreen 161 by using any suitable object or accessory such as a finger or a stylus), and drive a corresponding connection apparatus according to a preset program. Optionally, the touchscreen 161 may include two parts: a touch detection apparatus and a touch controller. The touch detection apparatus detects a touch direction of the user, detects a signal generated from the touch operation, and transfers the signal to the touch controller. The touch controller receives touch information from the touch detection apparatus, converts the touch information into touch point coordinates, and then sends the touch point coordinates to the processor 120. Moreover, the touch controller can receive and execute a command sent from the processor 120. In addition, the touchscreen 161 may be implemented in various types such as resistance-type, capacitance-type, infrared, and surface acoustic wave. In addition to the touchscreen 161, the input unit 160 may further include the another input device 162. Specifically, the another input device 162 may include, but is not limited to, one or more of a physical keyboard, a functional key (such as a volume control key or a switch key), a trackball, a mouse, or a joystick.

The display unit 170 may be configured to display information entered by the user or information provided for the user, and various menus of the mobile phone 100. The display unit 170 may include a display panel 171. Optionally, the display panel 171 may be configured in a form of a liquid crystal display (LCD), an organic light-emitting diode (OLED), or the like. Further, the touchscreen 161 may cover the display panel 171. After detecting a touch operation on or near the touchscreen 161, the touchscreen 161 transfers the touch operation to the processor 120 to determine a type of a touch event. Subsequently, the processor 120 provides a corresponding visual output on the display panel 171 based on the type of the touch event. Although, in FIG. 2, the touchscreen 161 and the display panel 171 are used as two separate parts to implement input and output functions of the mobile phone 100, in some embodiments, the touchscreen 161 and the display panel 171 may be integrated to implement the input and output functions of the mobile phone 100.

The audio circuit 180, a speaker 181, and a microphone 182 may provide an audio interface between a user and the mobile phone 100. The audio circuit 180 may convert received audio data into an electrical signal and transmit the electrical signal to the speaker 181. The speaker 181 converts the electrical signal into a sound signal for output. In addition, the microphone 182 converts a collected sound signal into an electrical signal. The audio circuit 180 receives the electrical signal, converts the electrical signal into audio data, and outputs the audio data to the RF circuit 190 to send the audio data to, for example, another mobile phone, or outputs the audio data to the memory 130 for further processing.

The RF circuit 190 may be configured to receive and send signals in an information receiving and sending process or a call process. Particularly, the RF circuit 410 receives downlink information from a base station, delivers the downlink information to the processor 120 for processing, and additionally sends uplink data to the base station. Usually, the RF circuit includes, but is not limited to, an antenna, at least one amplifier, a transceiver, a coupler, a low noise amplifier (LNA), a duplexer, and the like. In addition, the RF circuit 190 may further communicate with a network and another device through wireless communication. The wireless communication may use any communication standard or protocol, including, but not limited to, global system for mobile communications (GSM), general packet radio service (GPRS), code division multiple access (CDMA), wideband code division multiple access (WCDMA), long term evolution (LTE), email, and short messaging service (SMS).

Although not shown, the mobile phone 100 may further include a Bluetooth module, a global positioning system (GPS) module, a speaker, an accelerator, a gyroscope, a gravity sensor, an optical sensor, and the like.

With reference to the structure of the mobile phone shown in FIG. 2, the PMU is configured to perform power supply management on the various modules in the mobile phone. When the mobile phone is turned on, the user presses the power button to trigger the PMU to sequentially power on and wake up the various modules such as the processor, the display unit, and the input unit in the mobile phone in a particular clock sequence. When the mobile phone is turned off, similarly, the PMU triggers, in a particular clock sequence, the various modules such as the processor, the display unit, and the input unit in the mobile phone to be powered off. With reference to types of SEs, as shown in Table 1, results about whether the different types of SEs in the prior art can work when the mobile phone is turned off and specific working principles are as follows:

TABLE 1

| SE Type | Whether an SE can work when a mobile phone is turned off | Working principle of an SE in a turn-off state |
| --- | --- | --- |
| SIM-SE | Can | Obtain power from a battery when a current battery level of a mobile phone is sufficient; and supply power to a SIM-SE with an electrodynamic force obtained from a magnetic field generated by a POS machine, when the current battery level of the mobile phone is insufficient. |
| eSE | Can | Same as that of the SIM-SE |
| inSE | Cannot | |
| HCE | Cannot | |

With reference to Table 1, the inventor finds in the research that, in the prior art, when the mobile phone is turned off, the main processor in the mobile phone is in a power-off state, and then for an inSE integrated into the main processor or an HCE application run on the main processor, the inSE and/or the HCE application cannot work; and when some card applications are installed on the inSE or are HCE applications, the mobile phone cannot process the NFC service by using the inSE or the HCE applications.

Figure 3:
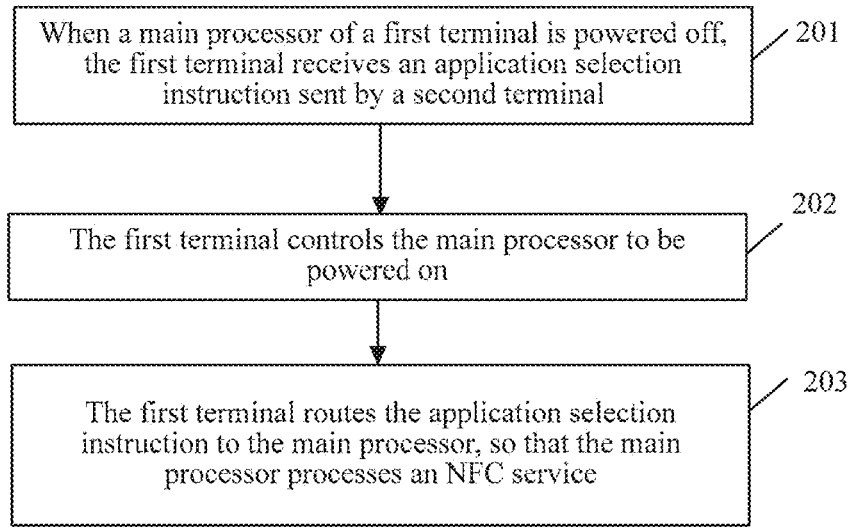
FIG. 3 is a schematic flowchart of an NFC service processing method according to an embodiment of this application.

To resolve the foregoing problem, an embodiment of this application provides an NFC service processing method, and the method is applied to a terminal supporting an NFC function. The terminal includes a main processor and an NFC chip, and an SE (referred to as a first SE in this embodiment of this application) is integrated into or an HCE application is run on the main processor. As shown in FIG. 3, the method includes the following steps.

201. When a main processor of a first terminal is powered off, the first terminal receives an application selection instruction sent by a second terminal.

The first terminal includes a terminal supporting an NFC function, such as a mobile phone. The second terminal includes another terminal supporting the NFC function, such as a POS machine. When a distance between the first terminal and the second terminal is within a distance range stipulated by an NFC protocol, the second terminal sends the application selection instruction to the first terminal, where the application selection instruction is used to instruct the first terminal to process an NFC service by using an application in the first SE or the HCE application. In addition, the application selection instruction carries an AID, used to instruct the first terminal to process the NFC service by using an application corresponding to the AID.

When the first terminal is turned off, the main processor of the first terminal is powered off. Therefore, as described in this embodiment of this application, the terminal being turned off or the main processor being powered off means that the main processor is powered off.

202. The first terminal controls the main processor to be powered on.

Optionally, a specific implementation process of powering on and waking up the main processor by the first terminal includes: determining, by the first terminal, a current battery level; and if the current battery level is greater than a threshold, powering on and waking up, by the first terminal, the main processor in a first clock sequence; or if the current battery level is less than the threshold, powering on and waking up, by the first terminal, the main processor in a second clock sequence. The first clock sequence is a turn-on to power-on sequence. The turn-on to power-on sequence is a turn-on-to-power-on sequence performed when the first terminal is normally turned on, for example, a turn-on-to-power-on sequence performed when a user presses a power button to turn on the first terminal. The second clock sequence is used to power on and wake up a module that is used to process the NFC service.

Specifically, the first terminal prestores two or more clock sequences, and then, the first terminal determines the current battery level. If the current battery level is sufficient to sustain the terminal to be normally turned on, the first terminal sequentially wakes up the various modules including the main processor, a display screen, a Bluetooth module, a gravity sensor, and the like of the first terminal in the first terminal in a clock sequence when the first terminal is normally turned on. Some of the modules are modules associated with processing of the NFC service, for example, the main processor in which an inSE is located; and some are modules not related to processing of the NFC service, for example, the Bluetooth module and the gravity sensor. If the current battery level is not sufficient to sustain the terminal to be normally tuned on, the first terminal supplies power by using a battery or supplies power by using an electrodynamic force in a magnetic field generated through interaction between the first terminal and the second terminal, and wakes up, in another clock sequence, only modules related to processing of the NFC service, for example, the main processor in which the inSE is located; and does not need to wake up other modules not related to processing of the NFC service, for example, the display and the Bluetooth module.

203. The first terminal routes the application selection instruction to the main processor, so that the main processor processes the NFC service.

In an implementation, when the first terminal includes only an inSE and/or an HCE application, and does not include another type of SE, after the first terminal receives the application selection instruction, the first terminal routes the application selection instruction to the main processor by default.

When the first terminal includes a plurality of types of SEs, the first terminal routes the application selection instruction to the SE or the HCE application in the main processor based on an AID carried in the application selection instruction, to process the NFC service.

According to the foregoing method, when the first terminal receives the application selection instruction that is sent by the second terminal and that is used to instruct the first terminal to process the NFC service by using the application in the first SE or the HCE application, the first terminal controls the main processor to be powered on. In this case, after the main processor is powered on, the SE in the main processor or the HCE application run on the main processor can process the NFC service. Therefore, according to the foregoing method, even if the SE is integrated into the main processor or the HCE application is installed on the main processor, the terminal can power on and wake up the main processor in a turn-off state, so that the SE integrated into the main processor or the HCE application run on the main processor can normally work to complete processing of the NFC service.

In the prior art, if not receiving a response from the first terminal within a particular time after sending the application selection instruction, the second terminal considers that this communication fails. In this embodiment of this application, because a process of controlling, by the first terminal, the main processor to be powered on is added after the application selection instruction from the second terminal is received, a response speed is relatively low. Therefore, optionally, to prevent the second terminal from considering that this communication fails due to a relatively short waiting time of the second terminal, when the first terminal determines that the main processor is powered off and needs to start a power-on procedure, this embodiment of this application further includes the following steps: sending, by the first terminal, a time extension instruction to the second terminal, where the time extension instruction carries to-be-extended duration, the time extension instruction is used to instruct the second terminal to increase waiting duration for communication, and the increased waiting duration is the to-be-extended duration. In this case, in this embodiment of this application, a process in which the first terminal sends the time extension instruction to the second terminal is added, and after receiving the time extension instruction, the second terminal increases duration for waiting for a response from the first terminal, so that the first terminal can have sufficient time to start a power-on process.

Optionally, after the NFC service is processed, the first terminal re-determines the current battery level. If the current battery level is greater than the threshold, the first terminal prompts the user whether to re-enter a turn-off state from the turn-on state, or maintain the turn-on state or power off and turn off the first terminal based on a selection of the user. If the current battery level is less than the threshold, the first terminal automatically powers off and turns off the first terminal.

Figure 4:
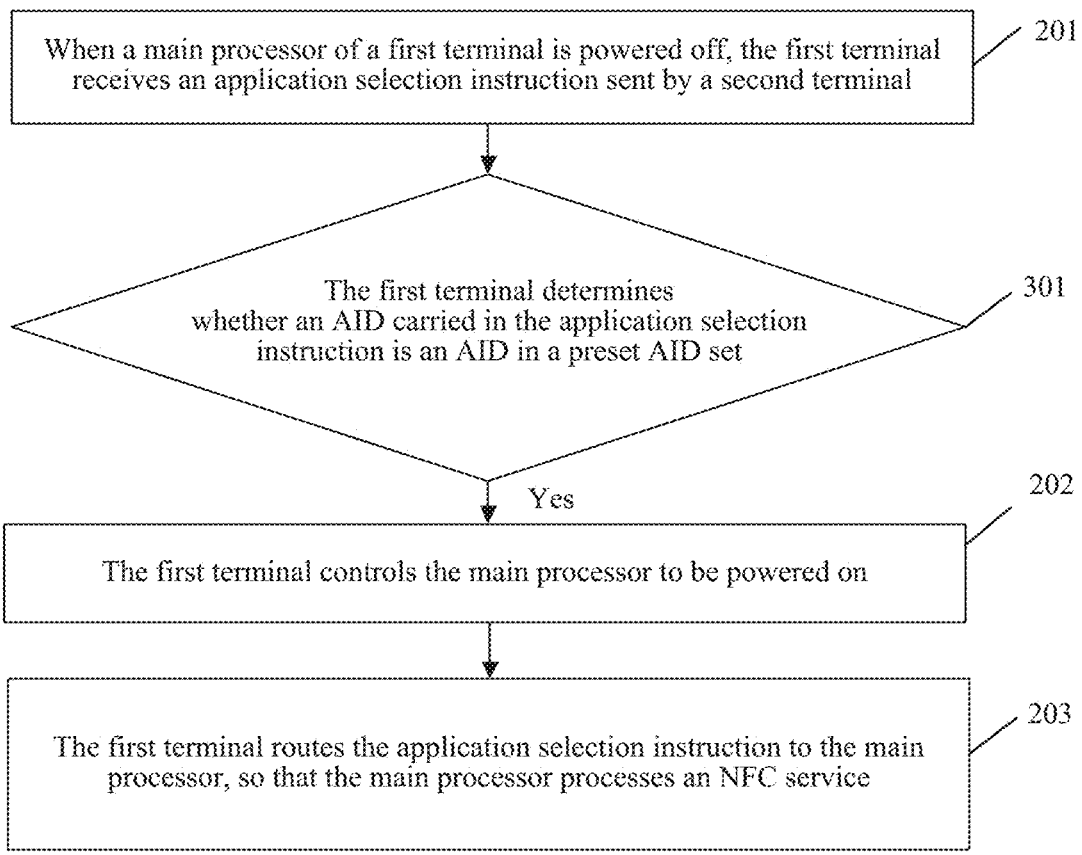
FIG. 4 is a schematic flowchart of another NFC service processing method according to an embodiment of this application.

Optionally, in addition to the SE integrated into the main processor, the first terminal may further include another type of SE, and the other type of SE is an SE configured independent of the main processor, such as a SIM-SE or an eSE (this type of SE is referred to as a second SE in this embodiment). In this case, as shown in FIG. 4, before step 202 of "controlling, by the first terminal, the main processor to be powered on", the method further includes the following steps:

301. The first terminal determines whether the MD carried in the application selection instruction is an AID in a preset AID set.

If the AID belongs to the preset AID set, the first terminal performs the foregoing steps to control the main processor to be powered on.

The preset AID set includes an AID of the application in the first SE and/or an AID of the HCE application.

In an implementation, the first terminal determines a type of the SE included in the first terminal. When the first terminal includes the SE (inSE) integrated into the main processor, the first terminal adds the AID of the application installed on the inSE to the preset AID set. When the first terminal further includes the HCE application, the AID of the HCE application is added to the preset AID set. When a same application (having a same AID) is installed on the inSE and another type of SE, for example, a bus application is installed on both the inSE and the SIM-SE, the SIM-SE can be powered on not depending on the main processor when the first terminal is turned off, and can obtain power from the battery or the magnetic field of the second terminal. Therefore, the SIM-SE can normally work to process some NFC services without a need that the main processor is powered on, and an AID of this type of application does not need to be added to the preset AID set.

Optionally, in an implementation, registration information of the application in the inSE or registration information of the HCE application are viewed to determine whether the application still has a card swiping requirement when the terminal is in a turn-off state. When there is an application that still has a card swiping requirement when the terminal is in the turn-off state, an AID of this type of application is added to the preset AID set; or when there is no application that has a card swiping requirement when the terminal is in the turn-off state, there is no need to determine an AID of this type of application as the preset AID. In another implementation, the user operates the mobile phone to set some applications to be applications that still have an off-state card swiping requirement.

Optionally, the registration information of the application in the inSE or the registration information of the HCE application are viewed to determine whether the application is in an activated state. When an application in the inSE or an HCE application has been activated, an AID of this type of application is added to the preset AID set. When an application in the inSE or an HCE application has not been activated, there is no need to add an AID of this type of application to the preset AID set.

When it is determined based on step 302 that the AID carried in the application selection instruction is an AID in the preset AID set, it indicates that an application corresponding to the AID carried in the application selection instruction is installed on the inSE or is the HCE application, and then the first terminal needs to power on and wake up the main processor to perform step 204 of processing the NFC service by the main processor, after the main processor is woken up.

According to the foregoing method, when the first terminal receives, in the turn-off state, an application selection instruction carrying an AID, the first terminal determines whether the AID is an AID in the preset AID set, and when the AID is an AID in the preset AID set, controls the main processor to be powered on. Therefore, according to the foregoing method, even if the SE is integrated into the main processor or the HCE application is installed on the main processor, the terminal can power on and wake up the main processor in a turn-off state, so that the SE integrated into the main processor or the HCE application run on the main processor can normally work to complete processing of the NFC service.

The first terminal described in this embodiment of this application includes a main processor, an NFC chip, and a PMU. A first SE is integrated into and/or an HCE application is run on the main processor. The NFC chip is configured to process an NFC service, and the PMU is configured to manage a power-on and a power-off process of the first terminal. In an actual application, a trigger condition of triggering the first terminal to enter a power-off and turn-off state includes that: when a current battery level of the first terminal is less than a particular threshold, the first terminal automatically turns off the first terminal; or when the current battery level is sufficient, a user triggers, by pressing a physical button, the first terminal to be turned off. In whichever case described above, a battery still has power when the first terminal is in the turn-off state. The NFC chip in the first terminal needs an extremely small amount of power, and even if the first terminal is in the turn-off state, the NFC chip can still be supplied with power in the battery, or supplied with power from an electrodynamic force in a magnetic field generated through interaction between the first terminal and the second terminal, to normally work. Therefore, before the main processor is powered on and woken up, the NFC chip in the first terminal can perform step 201 to step 203 to wake up the main processor.

Figure 5:
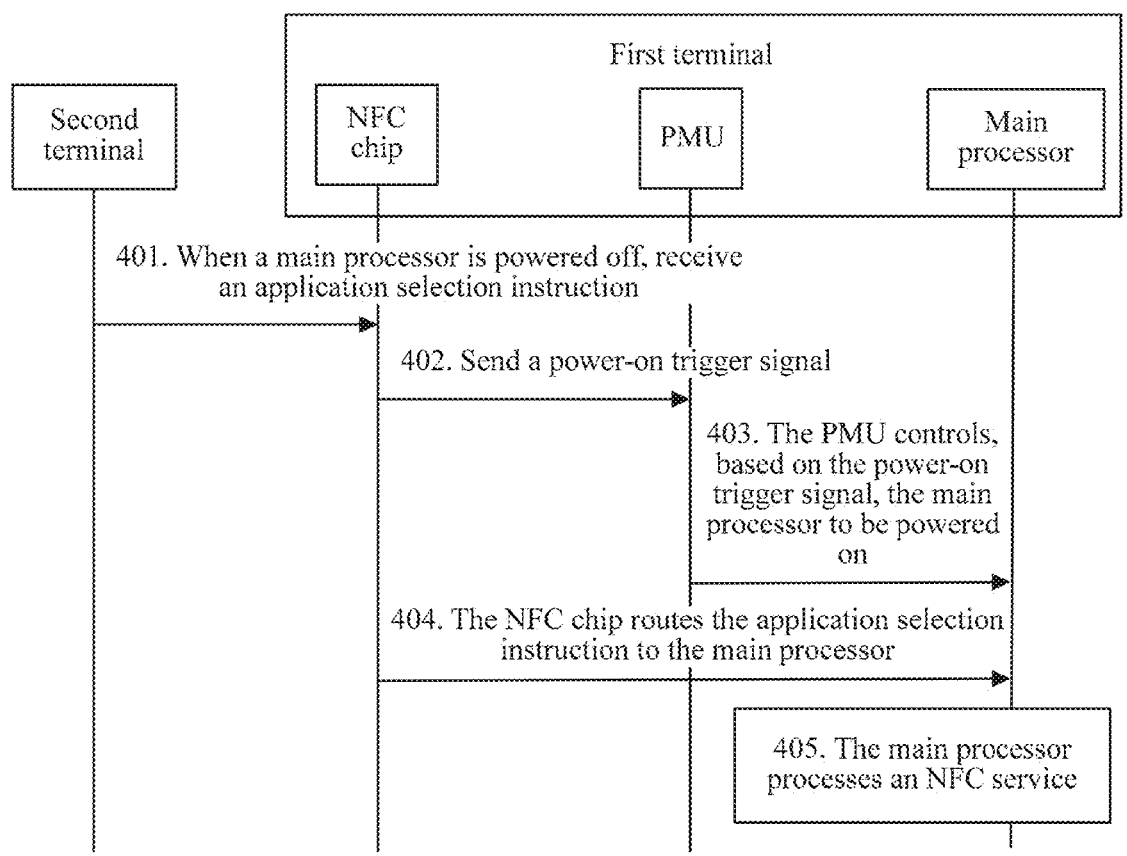
FIG. 5 is a schematic flowchart of still another NFC service processing method according to an embodiment of this application.

Therefore, as shown in FIG. 5, an embodiment of this application provides an NFC service processing method, and the method includes the following steps.

401. When the main processor is powered off, the NFC chip receives an application selection instruction sent by a second terminal.

The application selection instruction is used to instruct to process an NFC service by using an application in the first SE or the HCE application.

When the main processor is powered off, the main processor sends a notification signal to the NFC chip; or the NFC chip may locally store a configuration file of a system, where the configuration file records a status of the main processor, including a power-on state or a power-off state. Then, the NFC chip determines whether the main processor is powered off, based on a power-off signal sent by the main processor or by reading the configuration file.

402. The NFC chip sends a power-on trigger signal to the PMU.

403. The PMU controls, based on the power-on trigger signal, the main processor to be powered on.

After the main processor is powered on, the main processor sends a notification signal to NFC, to notify the NFC chip that the main processor has been powered on. This process can be considered as performing, by the main processor, a handshake with the NFC chip, to notify the NFC chip that the main processor has been powered on.

404. The NFC chip routes the application selection instruction to the main processor.

405. The main processor processes the NFC service.

According to the foregoing method, when the NFC chip of the first terminal receives the application selection instruction that is sent by the second terminal and that is used to instruct the first terminal to process the NFC service by using the application on the first SE or the HCE application, the NFC chip sends the power-on trigger signal to the PMU, and the PMU triggers, based on the power-on trigger signal, the main processor to be powered on. In this case, after the main processor is powered on, the SE in the main processor or the HCE application run on the main processor can process the NFC service. Therefore, according to the foregoing method, even if the SE is integrated into the main processor or the HCE application is installed on the main processor, the terminal can power on and wake up the main processor in a turn-off state, so that the SE integrated into the main processor or the HCE application run on the main processor can normally work to complete processing of the NFC service.

Optionally, the first terminal further includes a second SE. The second SE includes other SEs not integrated into the main processor, such as a SIM-SE and an inSE. Then, before the sending, by the NFC chip, a power-on trigger signal to the PMU, the method further includes: determining, by the NFC chip, whether an AID carried in the application selection instruction is an AID in a preset AID set; and if the AID is an AID in the preset AID set, sending, by the NFC chip, the power-on trigger signal to the PMU.

The preset AID set includes an AID of the application installed on the first SE and/or an AID of the HCE application. The preset AID set is determined by the main processor, and the preset AID set is configured for the NFC chip.

Optionally, before the sending, by the NFC chip, the power-on trigger signal to the PMU, the method further includes: sending, by the NFC chip, a time extension instruction to the second terminal, where the time extension instruction carries to-be-extended duration, and the time extension instruction is used to instruct the second terminal to increase waiting duration for communication, and the increased waiting duration is the to-be-extended duration.

Optionally, the process of controlling, by the PMU based on the power-on trigger signal, the main processor to be powered on specifically includes: determining, by the PMU, a current battery level; and if the current battery level is greater than a threshold, powering on and waking up, by the PMU, the main processor in a first clock sequence; or if the current battery level is less than the threshold, waking up, by the PMU, the main processor in a second clock sequence. As described above, the first clock sequence is a turn-off and power-on sequence, and the second clock sequence is used to wake up only a module that is used to process the NFC service.

Optionally, after the processing, by the main processor, the NFC service, the method further includes: when the main processor has processed the NFC service, prompting a user that the NFC service has been processed.

Optionally, after the processing, by the main processor, the NFC service, the method further includes: when the main processor has processed the NFC service, determining, by the main processor, the current battery level; and if the current battery level is greater than the threshold, prompting, by the main processor, the user whether to turn off the first terminal; or if the current battery level is less than the threshold, controlling, by the PMU, the main processor to be powered off.

In conclusion, when the foregoing methods provided in the embodiments of this application are implemented, the first terminal performs the following process: determining a preset AID, processing the NFC service by using the determined preset AID when the first terminal is turned off, and after the terminal has processed the NFC service, sustaining the first terminal to be turned on or automatically turning off the first terminal.

Figure 6:
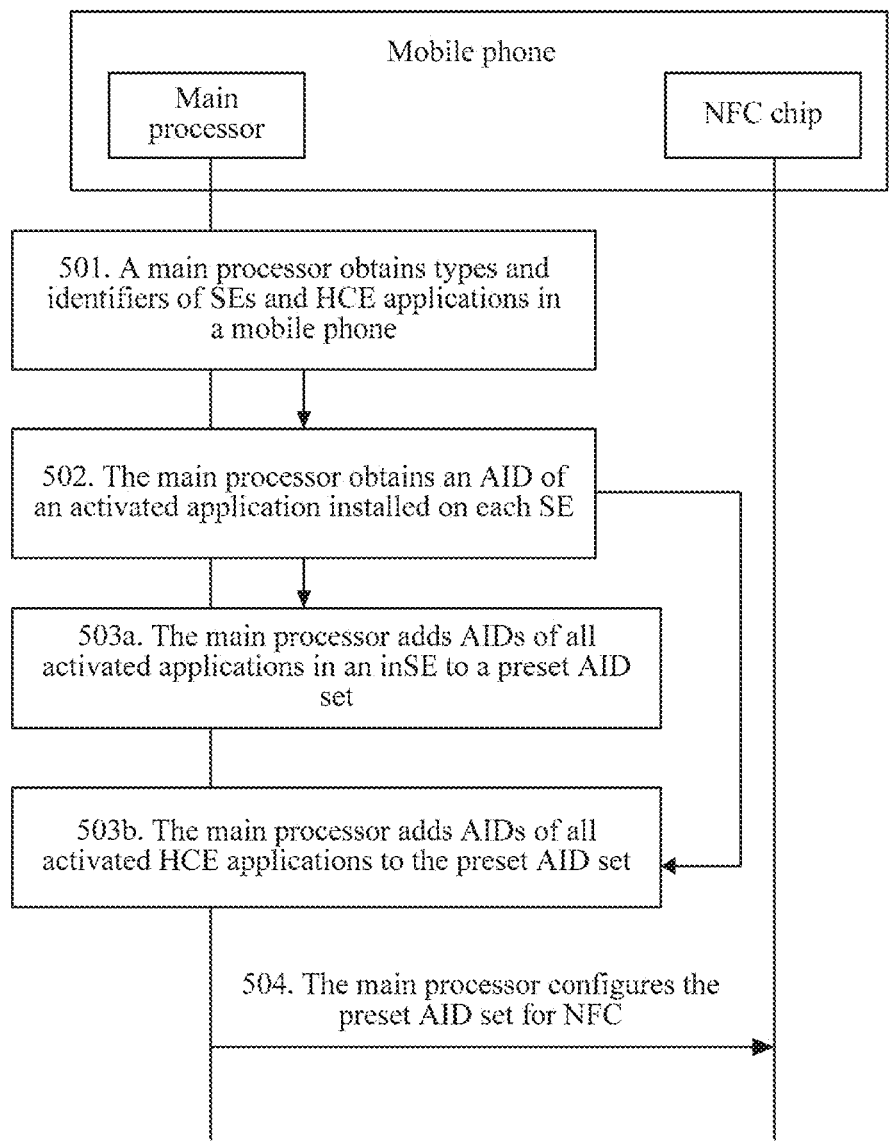
FIG. 6 is a schematic flowchart of configuring a preset AID set for NFC by a main processor in a mobile phone according to an embodiment of this application.

With reference to the structure of the mobile phone shown in FIG. 2, as shown in FIG. 6, a process of determining a preset AID by the mobile phone includes the following steps:

501. A main processor obtains types and identifiers of SEs and HCE applications in a mobile phone.

Specifically, to process the NFC service, a mobile phone system supports an NFC protocol stack. The NFC protocol stack defines a plurality of commands, and execution of different commands leads to different execution results. In this step, the main processor executes an SE discovery (SE Discovery) command to determine the types and identifiers of the SEs and the identifiers of the HCE applications in the mobile phone.

When the mobile phone includes an inSE or HCE, the mobile phone performs the following steps.

502. The main processor obtains an AID of an activated application installed on each SE.

Specifically, the main processor sends an indication message to each SE, to instruct the SE to reply with the AID of the activated application. After receiving the indication message, the SE obtains statuses, "activated" and "inactivated", of all applications based on attribute information of the installed application. The SE feeds back the AID of the activated application to the main processor, and the main processor obtains AIDs of all activated applications.

For example, the AID of the activated application and an identifier of an SE in which the activated application is located are shown in Table 2 below:

TABLE 2

| AID of an activated application | Identifier of an SE in which an activated application is located |
| --- | --- |
| AID 1 | SIM-SE 1, inSE 1 |
| AID 2 | SIM-SE 1 |
| AID 3 | inSE 1 |
| AID 4 | HCE 1 |

Based on the SE in which the activated application is located, when the inSE includes an activated application, the following step 503a is performed to add an AID of the activated application in the inSE to the preset AID set. When all HCE applications are in an activated state, the mobile phone performs the following step 503b to add AIDs of the HCE applications to the preset AID set. When an activated application is installed on both the inSE and the SIM-SE, the mobile phone does not need to add an AID of this application to the preset AID set.

503a. The main processor adds AIDs of all activated applications in an inSE to a preset AID set.

503b. The main processor adds AIDs of all activated HCE applications to the preset AID set.

Optionally, in another implementation, if a same application (having a same AID) is installed on the inSE or another type of SE such as the SIM-SE, the main processor does not need to configure an AID of this application for the NFC, and configures, for the NFC, only the AIDs of the activated applications installed on the inSE.

Optionally, in another implementation, when determining the preset AID set, the main processor determines, based on configuration information of an application, whether the application has an off-state card swiping requirement, and the main processor adds an AID of an application that meets the foregoing condition and that has an off-state card swiping requirement to the preset AID set.

504. The main processor configures the preset AID set for the NFC.

Optionally, in an implementation, the main processor configures an AID in the preset AID set for the NFC only. Then, when the NFC receives a SELECT AID instruction, if an AID carried in the SELECT AID instruction is an AID in the preset AID set, the NFC routes the SELECT AID instruction to a corresponding SE based on a standard route table. The standard route table describes routing rules of how to route the SELECT AID instruction to the corresponding SE based on the AID. For a specific implementation, refer to the prior art, and details are not described herein.

In another implementation, the main processor configures, for the NFC, the preset AID set and an identifier of an SE in which an application corresponding to each AID in the preset AID set is located. Then, when the NFC receives the SELECT AID instruction, if the AID carried in the SELECT AID instruction is an AID in the preset AID set, the NFC routes the SELECT AID instruction to the corresponding SE based on the identifier of the SE corresponding to the AID.

Step 501 to step 504 shown in FIG. 6 may be automatically performed by the mobile phone when the mobile phone is turned on and initialized or when the mobile phone enables an NFC function, or the user selects to add AIDs of some applications to the preset AID set.

Figure 7:
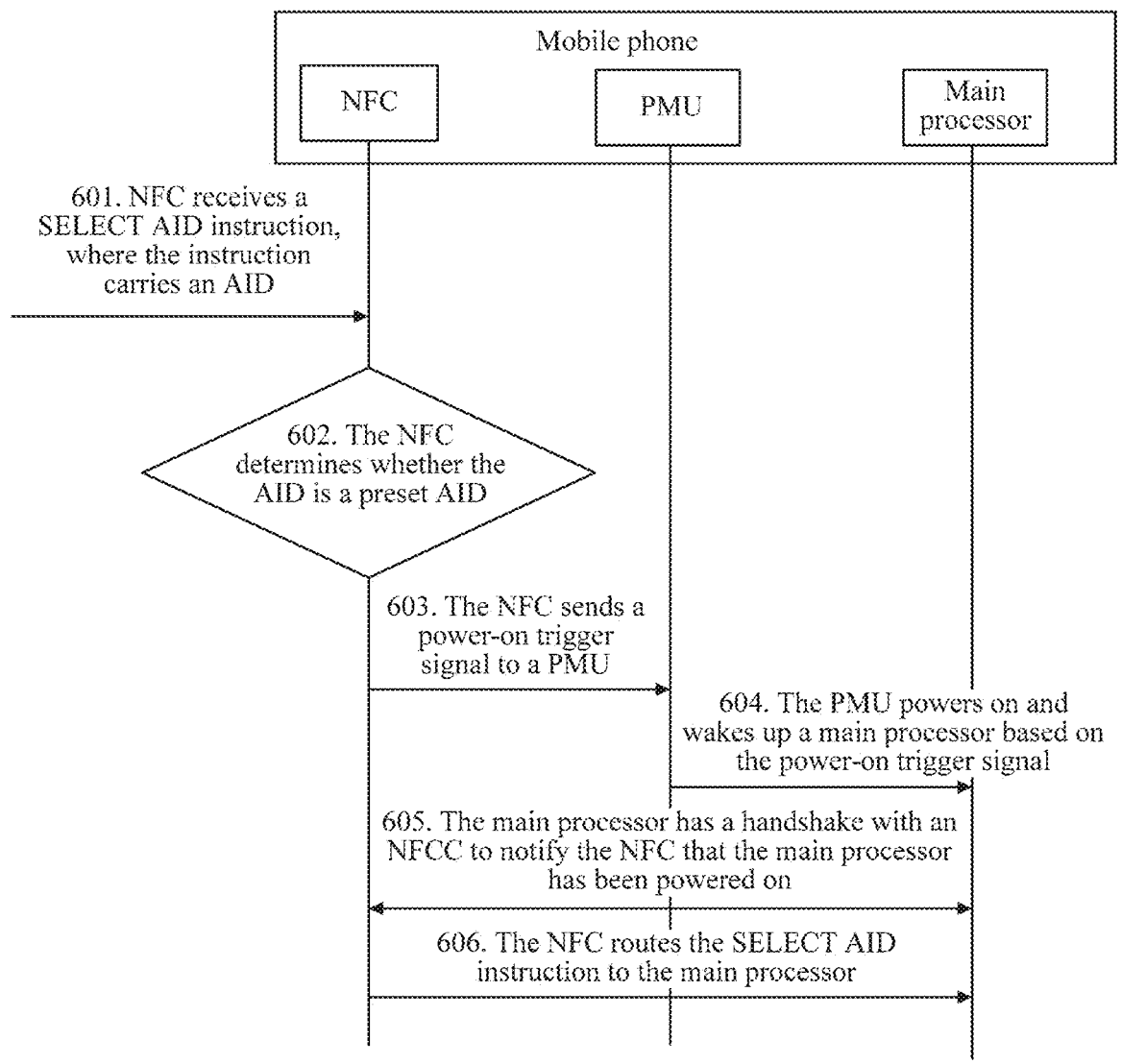
FIG. 7 is a schematic flowchart of implementing the foregoing NFC service processing method in a mobile phone according to an embodiment of this application.

After the preset AID set is determined by using the method shown in FIG. 6, as shown in FIG. 7, a process in which the mobile phone processes the NFC service based on the determined preset AID set when the mobile phone is turned off includes the following steps.

601. NFC receives a SELECT AID instruction.

The SELECT AID carries an application identifier AID,

For example, when the mobile phone and another non-contact terminal supporting an NFC function are spaced by a distance less than that stipulated in an NFC protocol, the mobile phones enters a magnetic field of the non-contact terminal. The non-contact terminal sends a SELECT AID instruction to the mobile phone, and the instruction carries an AID.

In addition, when the main processor is powered off, the main processor sends a notification signal to the NFC chip; or the NFC chip may locally store a configuration file of a system, where the configuration file records a status of the main processor, including a power-on state or a power-off state. Then, the NFC chip determines, based on a power-off signal sent by the main processor or by reading the configuration file, whether the main processor is powered off. When determining that the mobile phone is powered off, the NFC chip performs the following step 602.

602. The NFC determines whether the AID belongs to a preset AID set.

603. When the AID belongs to the preset AID set, the NFC sends a power-on trigger signal to a PMU.

During implementation, the NFC sends a current signal to the PMU by using a bus, and the current signal is used to trigger the PMU to be powered on.

604. The PMU receives the power-on trigger signal sent by the NFC, and powers on and wakes up the main processor based on the power-on trigger signal.

The PMU determines a current battery level. If the current battery level is greater than a threshold, the PMU powers on and wakes up various modules such as the main processor and a screen in the mobile phone, in a clock sequence the same as that used when a power button triggers the PMU; and if the current battery level is less than the threshold, the PMU excites another clock sequence with reference to the current battery level and power obtained from an electrodynamic force generated from a magnetic field, to turn on and power up only modules related to processing of the NFC service.

These modules do not include modules unrelated to processing of the NFC service, such as a screen and a coprocessor.

605. The main processor has a handshake with the NFC to notify the NFC that the main processor has been powered on.

606. The NFC routes the SELECT AID instruction to an SE or an ME application in the main processor based on the AID carried in the SELECT AID instruction, to process the NFC service.

Specifically, if the NFC stores a correspondence between each AID in the preset AID set and the SE, and then, the NFC routes, based on the correspondence relationship, a SELECT AID instruction route to the SE corresponding to the AID. If the NFC does not store the correspondence between each AID in the preset AID set and the SE, the NFC routes the SELECT AID instruction to the corresponding SE based on a standard route table; or the NFC routes the SELECT AID instruction to a default SE or HCE application.

Figure 8:
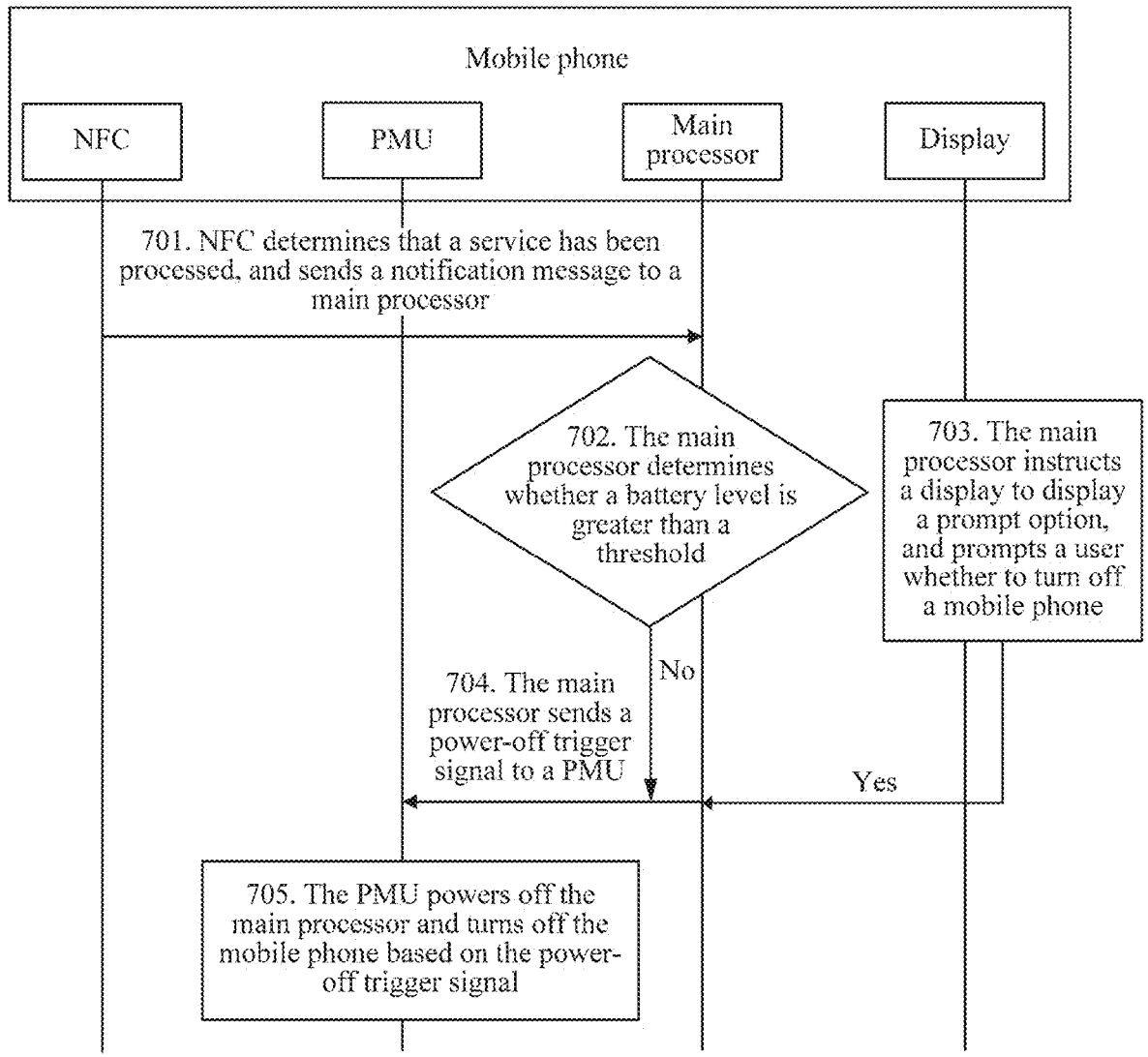
FIG. 8 is a schematic diagram of a processing procedure after a mobile phone has processed an NFC service according to an embodiment of this application.

After having processed the NFC service by using the method shown in FIG. 7, as shown in FIG. 8, a mobile phone performs the following processing processes, including:

701. An NFC chip determines that a service has been processed, and sends a notification message to a main processor.

Specifically, when the NFC chip determines that the mobile phone has left a magnetic field of a POS machine, or determines that a card reading message has been sent to the POS machine, the NFC chip confirms that the NFC service has been processed, and the NFC chip sends a notification message to the main processor, where the notification message is used to notify the main processor that this NFC service has been processed.

Considering that after the NFC service has been processed, another non-contact device may still have an instruction, and to provide enough time for this communication, preset duration is set. After waiting for the preset duration, the NFC sends the notification message to the main processor.

702. After receiving the notification message from the NFC chip, the main processor determines whether a current battery level is greater than a threshold.

Specifically, after receiving the notification message from the NFC chip, the main processor determines that this power-on type is a power-on type triggered by the NFC chip. Then, the main processor determines the current battery level. When the current battery level is greater than the threshold, which indicates that the current battery level is sufficient to sustain the mobile phone to maintain the turn-on state, the main processor performs the following step 703. When the current battery level is less than the threshold, the main processor performs the following step 704.

703. The main processor instructs a display to display a prompt option.

The prompt option is used to prompt a user whether to maintain the turn-on state, and when the user determines to maintain the turn-on state, the mobile phone maintains the turn-on state. When the user determines not to maintain the turn-on state, the following step 704 is to be performed.

704. The main processor sends a power-off trigger signal to a PMU.

705. The PMU powers off the main processor and turns off the mobile phone based on the power-off trigger signal.

Figure 9:
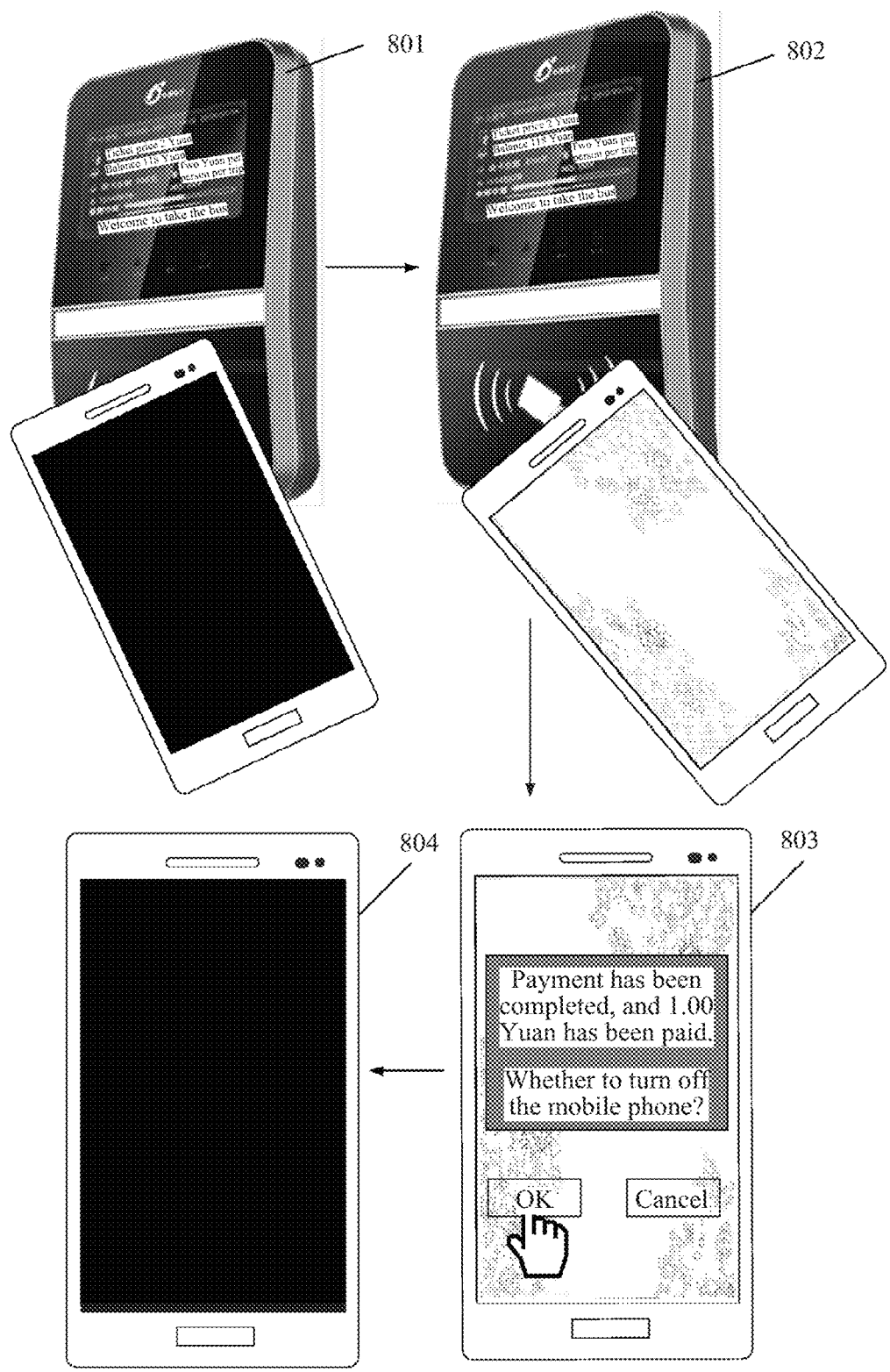
FIG. 9 is a schematic diagram of an interface on which a mobile phone processes an NFC service in a turn-off state according to an embodiment of this application.

Referring to FIG. 9, to more clearly describe the NFC service processing method provided in the embodiments of this application, when a mobile phone approaches a bus card reader in a turn-off state, as shown in a process 801 in FIG. 9, the mobile phone controls, in a normal turn-on-to-power-on sequence, a main processor to be powered on to process the NFC service, as shown in a process 802 in FIG. 9. After the mobile phone has processed the NFC service, as shown in a process 803 in FIG. 9, the mobile phone displays prompt information, the prompt information includes prompt information that indicates to a user that NFC payment has been processed and indicates an NFC payment amount, and the prompt information further includes prompt information inquiring the user whether to re-turn off the mobile phone. When the user clicks OK, as shown in a process 804 in FIG. 9, the mobile phone re-enters the turn-off state.

Figure 10:
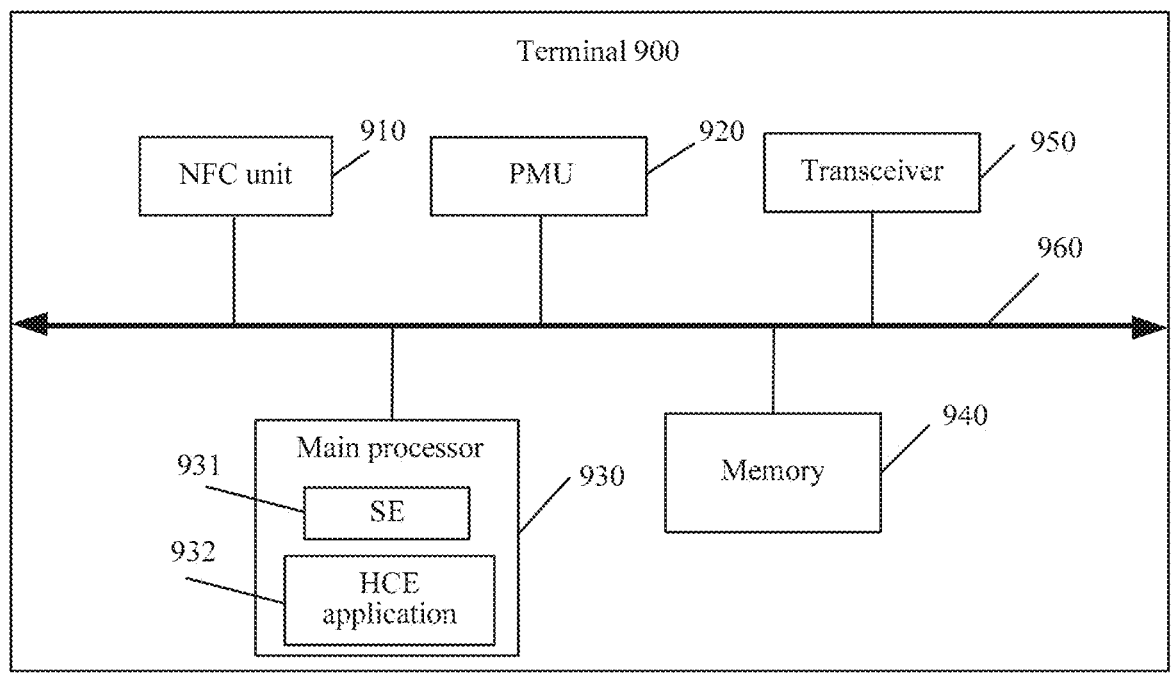
FIG. 10 is a schematic structural diagram of a terminal according to an embodiment of this application.

To implement the foregoing methods provided in the embodiments of this application, as shown in FIG. 10, an embodiment of this application provides a terminal, and the terminal 900 is used as a first terminal and includes a near field communication NFC chip 910, a PMU 920, and a main processor 930. The NFC chip 910 includes an NFC controller (NFCC) and an NFC antenna. A security element SE 931 is integrated into or a host-based card emulation HCE application 932 is installed on the main processor 930. In addition, the terminal 900 further includes a memory 940, a transceiver 950, and a bus 960. The NFC chip 910, the PMU 920, the main processor 930, the memory 940, and the transceiver 950 are connected to each other by using the bus 960.

The processor 930 may be a central processing unit (CPU), a general-purpose processor, a digital signal processor (DSP), an application-specific integrated circuit (ASIC), a field programmable gate array (FPGA), or another programmable logical device, a transistor logical device, a hardware component, or a combination thereof. The processor may implement or execute various examples of logical blocks, modules, and circuits described with reference to the content disclosed in this application. Alternatively, the processor may be a combination of processors implementing a computing function, for example, a combination of one or more microprocessors, or a combination of the DSP and a microprocessor.

The memory 940 may be configured to store a software program and a module. The main processor 930 executes the software program and the module stored in the memory 940, to perform various functional application and data processing of the terminal 900. The memory 940 may mainly include a program storage area and a data storage area. The program storage area may store an operating system, an application program required by at least one function (such as a sound playing function and an image display function), and the like. The data storage area may store data (such as audio data, image data, and an address book) created according to use of the terminal 900, and the like. In addition, the memory 940 may include a high-speed random access memory, and may further include a non-volatile memory, such as at least one magnetic disk storage device, a flash memory device, or another volatile solid-state storage device.

The transceiver 950 is configured to support the terminal 900 to interact with another device.

The bus 960 may be a peripheral component interconnect (PCI) bus, an extended industry standard architecture (EISA) bus, and or the like. The bus may be classified into an address bus, a data bus, a control bus, and the like. For ease of representation, only one thick line is used to represent the bus in FIG. 8, but this does not mean that there is only one bus or only one type of bus.

The NFC chip 910 is configured to: when the main processor of the first terminal is powered off, receive an application selection instruction sent by a second terminal, where the application selection instruction is used to instruct to process an NFC service by using an application in the first SE or the HCE application. The NFC chip 910 is further configured to send a power-on trigger signal to the PMU. The PMU 920 is configured to power on and wake up the main processor 930 based on the power-on trigger signal sent by the NFC chip 910. The NFC chip 910 is further configured to route the application selection instruction to the main processor 930. The main processor 930 is configured to process the NFC service.

Optionally, when the first terminal further includes a second SE, the NFC chip 910 is further configured to determine whether an application identifier AID carried in the application selection instruction is an AID in a preset AID set. When the AID is an AID in the preset AID set, the NFC chip 910 sends the power-on trigger signal to the PMU 920. The second SE and the main processor are independently configured. The preset AID set includes an AID of the application installed on the SE of the main processor or an AID of the HCE application.

The PMU 920 is configured to power on and wake up the main processor 930 based on the power-on trigger signal sent by the NFC chip 910. The NFC chip 910 is further configured to route the application selection instruction to the SE or the HCE application in the main processor 930 based on the AID carried in the application selection instruction, to process the NFC service.

Optionally, the main processor 930 is further configured to add an application identifier AID of a target application to the preset AID set. The target application includes the application installed on the SE of the main processor or the IKE application. The main processor 930 is further configured to configure the preset AID for the NFC chip 910.

Optionally, the NFC chip 910 is further configured to send a time extension instruction to the second terminal, where the time extension instruction carries to-be-extended duration, and the time extension instruction is used to instruct the second terminal to increase waiting duration for communication, and the increased waiting duration is the to-be-extended duration.

Optionally, the PMU 920 is further configured to: determine a current battery level; and when the current battery level is greater than a threshold, power on and wake up the main processor in a first clock sequence; or when the current battery level is less than the threshold, power on and wake up the main processor in a second clock sequence. The first clock sequence is a turn-on-to-power-on sequence, and the second clock sequence is used to wake up only a module that is used to process the NFC service.

Optionally, the main processor 930 is further configured to: when having processed the NFC service, prompt a user that the NFC service has been processed.

Optionally, the NFC chip 910 is further configured to send a notification message to the main processor 930, where the notification message is used to notify that the main processor has completed the NFC service. The main processor 930 is further configured to: determine the current battery level based on the notification message sent by the NFC chip 910; and when the current battery level is greater than the threshold, prompt the user whether to turn off the first terminal; or when the current battery level is less than the threshold, send a power-off trigger signal to the PMU 920. The PMU 920 is further configured to power off and turn off the terminal based on the power-off trigger signal sent by the main processor 930.

According to the first terminal, when the NFC chip of the first terminal receives the application selection instruction that is sent by the second terminal and that is used to instruct the first terminal to process the NFC service by using the application in the first SE or the HCE application, the NFC chip sends the power-on trigger signal to the PMU, and the PMU triggers, based on the power-on trigger signal, the main processor to be powered on. In this case, after the main processor is powered on, the SE in the main processor or the HCE application run on the main processor can process the NFC service. Therefore, according to the foregoing method, even if the SE is integrated into the main processor or the HCE application is installed on the main processor, the terminal can power on and wake up the main processor in a turn-off state, so that the SE integrated into the main processor or the HCE application run on the main processor can normally work to complete processing of the NFC service.

An embodiment of this application further provides an NFC chip. The near field communication NFC chip is located in a first terminal, the first terminal further includes a main processor and a power management unit PMU, and a first security element SE is integrated into and/or a host-based card emulation HCE application is run on the main processor. The NFC chip is configured to receive an application selection instruction sent by a second terminal, where the application selection instruction is used to instruct to process an NFC service by using an application in the first SE or the HCE application. The NFC chip is further configured to: determine whether the main processor is powered off; and when the main processor is powered off, send a power-on trigger signal to the PMU, so that the PMU powers on and wakes up the main processor based on the power-on trigger signal. The NFC chip is further configured to route the application selection instruction to the main processor, so that the main processor processes the NFC service.

When the main processor is powered off, the main processor sends a notification signal to the NFC chip; or the NFC chip may locally store a configuration file of a system, where the configuration file records a status of the main processor, including a power-on state or a power-off state. Then, the NFC chip determines whether the main processor is powered off, based on a power-off signal sent by the main processor or by reading the configuration file.

Optionally, the NFC chip is further configured to: when the first terminal further includes a second SE, determine whether an application identifier AID carried in the application selection instruction is a preset AID; and when the AID is the preset AID, send the power-on trigger signal to the PMU. The second SE and the main processor are independently configured.

Optionally, the NFC chip is further configured to send a time extension instruction to the second terminal, where the time extension instruction carries to-be-extended duration, and the time extension instruction is used to instruct the second terminal to increase waiting duration for communication, and the increased waiting duration is the to-be-extended duration.

According to the NFC chip, when the application selection instruction that is sent by the second terminal and that is used to instruct the first terminal to process the NFC service by using the application in the first SE or the HCE application is received, the NFC chip sends the power-on trigger signal to the PMU, so that the PMU triggers, based on the power-on trigger signal, the main processor to be powered on. In this case, after the main processor is powered on, the SE in the main processor or the HCE application run on the main processor can process the NFC service. Therefore, according to the foregoing method, even if the SE is integrated into the main processor or the HCE application is installed on the main processor, the NFC chip can power on and wake up the main processor in a turn-off state, so that the SE integrated into the main processor or the HCE application run on the main processor can normally work to complete processing of the NFC service.

A person of ordinary skill in the art should easily be aware that, in combination with the examples described in the embodiments disclosed in this specification, units, algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Method or algorithm steps described in combination with the content disclosed in this application may be implemented by hardware, or may be implemented by a processor by executing a software instruction. The software instruction may include a corresponding software module. The software module may be stored in a random access memory (RAM), a flash memory, a read-only memory (ROM), an erasable programmable read only memory (EPROM), an electrically erasable programmable read only memory (EEPROM), a register, a hard disk, a mobile hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC.

A person skilled in the art should be aware that in the foregoing one or more examples, functions described in this application may be implemented by hardware, software, firmware, or any combination thereof. When the present invention is implemented by software, the foregoing functions may be stored in a computer readable medium or transmitted as one or more instructions or code in the computer readable medium. The computer readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of this application are further described in detail in the foregoing specific embodiments. It should be understood that the foregoing descriptions are merely specific embodiments of this application, but are not intended to limit the protection scope of this application. Any modification, equivalent replacement or improvement made based on technical solutions of this application shall fall within the protection scope of this application.

What is claimed is:

1. A near field communication (NFC) service processing method, wherein the method is applied to a first terminal, the first terminal comprises a main processor and an NFC chip, and a first security element (SE) is integrated into and/or a host-based card emulation HCE application runs on the main processor; and the method comprises:
when the main processor of the first terminal is powered off, receiving, by the first terminal, an application selection instruction sent by a second terminal, wherein the application selection instruction is used to instruct to process an NFC service by using an application in the first SE or the HCE application;

controlling, by the first terminal, the main processor to be powered on; and routing, by the first terminal, the application selection instruction to the main processor, so that the main processor processes the NFC service;

wherein the first terminal further comprises a second SE, and the second SE and the main processor are independently configured; and before the controlling, by the first terminal, the main processor to be powered on, the method further comprises:

determining, by the first terminal, whether an application identifier (AID) carried in the application selection instruction is an AID in a preset AID set, wherein the preset AID set comprises an AID of the application installed on the first SE and/or an AID of the HCE application; and if the AID is an AID in the preset AID set, controlling, by the first terminal, the main processor to be powered on.

2. The method according to claim 1, wherein before the controlling, by the first terminal, the main processor to be powered on, the method further comprises:

sending, by the first terminal, a time extension instruction to the second terminal, wherein the time extension instruction carries a to-be-extended duration, and the time extension instruction is used to instruct the second terminal to increase a waiting duration for communication, and the increased waiting duration is the to-be-extended duration.

3. The method according to claim 2, wherein after the routing, by the first terminal, the application selection instruction to the main processor, the method further comprises:

when the first terminal has processed the NFC service, prompting, by the first terminal, a user that the NFC service has been processed.

4. The method according to claim 2, wherein after the routing, by the first terminal, the application selection instruction to the main processor, the method further comprises:

when the first terminal has processed the NFC service, determining, by the first terminal, the current battery level; and if the current battery level is greater than the threshold, prompting, by the first terminal, the user whether to turn off the first terminal; or if the current battery level is less than the threshold, controlling, by the first terminal, the main processor to be powered off.

5. The method according to claim 1, wherein the controlling, by the first terminal, the main processor to be powered on comprises:

determining, by the first terminal, a current battery level; and if the current battery level is greater than a threshold, powering on and waking up, by the first terminal, the main processor in a first clock sequence; or if the current battery level is less than the threshold, powering on and waking up, by the first terminal, the main processor in a second clock sequence, wherein the first clock sequence is a turn-on-to-power-on sequence, and the second clock sequence is used to wake up only a module that is used to process the NFC service.

6. The method according to claim 5, wherein after the routing, by the first terminal, the application selection instruction to the main processor, the method further comprises:

when the first terminal has processed the NFC service, prompting, by the first terminal, a user that the NFC service has been processed.

7. The method according to claim 5, wherein after the routing, by the first terminal, the application selection instruction to the main processor, the method further comprises:

when the first terminal has processed the NFC service, determining, by the first terminal, the current battery level; and if the current battery level is greater than the threshold, prompting, by the first terminal, the user whether to turn off the first terminal; or if the current battery level is less than the threshold, controlling, by the first terminal, the main processor to be powered off.

8. The method according to claim 1, wherein after the routing, by the first terminal, the application selection instruction to the main processor, the method further comprises:

when the first terminal has processed the NFC service, prompting, by the first terminal, a user that the NFC service has been processed.

9. The method according to claim 1, wherein after the routing, by the first terminal, the application selection instruction to the main processor, the method further comprises:

when the first terminal has processed the NFC service, determining, by the first terminal, the current battery level; and if the current battery level is greater than the threshold, prompting, by the first terminal, the user whether to turn off the first terminal; or if the current battery level is less than the threshold, controlling, by the first terminal, the main processor to be powered off.

10. A terminal, wherein the terminal is used as a first terminal and comprises a near field communication (NFC) chip, a power management unit (PMU), and a main processor, and a first security element is disposed in or a host-based card emulation (HCE) application runs on the main processor, the NFC chip is configured to: when the main processor is powered off, receive an application selection instruction sent by a second terminal, wherein the application selection instruction is used to instruct to process an NFC service by using an application in the first SE or the HCE application;

the NFC chip is further configured to send a power-on trigger signal to the PMU;

the PMU is configured to power on and wake up the main processor based on the power-on trigger signal sent by the NFC chip;

the NFC chip is further configured to route the application selection instruction to the main processor; and the main processor is configured to process the NFC service;

wherein the first terminal further comprises a second SE, and the second SE and the main processor are independently configured; and the NFC chip is further configured to: determine whether an application identifier (AID) carried in the application selection instruction is an AID in a preset AID set; and when the AID is an AID in the preset AID set, send the power-on trigger signal to the PMU, wherein the preset AID set comprises an AID of the application installed on the first SE and/or an AID of the HCE application.

11. The terminal according to claim 10, wherein
the NFC chip is further configured to send a time extension instruction to the second terminal, wherein the time extension instruction carries a to-be-extended duration, and the time extension instruction is used to instruct the second terminal to increase a waiting duration for communication, and the increased waiting duration is the to-be-extended duration.

12. The terminal according to claim 11, wherein
the main processor is further configured to: when having processed the NFC service, prompt a user that the NFC service has been processed.

13. The terminal according to claim 11, wherein
the main processor is further configured to: when having processed the NFC service, determine the current battery level; and when the current battery level is greater than the threshold, prompt the user whether to turn off the first terminal; or when the current battery level is less than the threshold, control the main processor to be powered off.

14. The terminal according to claim 10, wherein
the PMU is further configured to: determine a current battery level; and when the current battery level is greater than a threshold, power on and wake up the main processor in a first clock sequence; or when the current battery level is less than the threshold, wake up the main processor in a second clock sequence, wherein the first clock sequence is a turn-on-to-power-on sequence, and the second clock sequence is used to power on and wake up only a module that is used to process the NFC service.

15. The terminal according to claim 14, wherein
the main processor is further configured to: when having processed the NFC service, prompt a user that the NFC service has been processed.

16. The terminal according to claim 14, wherein
the main processor is further configured to: when having processed the NFC service, determine the current battery level; and when the current battery level is greater than the threshold, prompt the user whether to turn off the first terminal; or when the current battery level is less than the threshold, control the main processor to be powered off.

17. The terminal according to claim 10, wherein
the main processor is further configured to: when having processed the NFC service, prompt a user that the NFC service has been processed.

18. The terminal according to claim 10, wherein
the main processor is further configured to: when having processed the NFC service, determine the current battery level; and when the current battery level is greater than the threshold, prompt the user whether to turn off the first terminal; or when the current battery level is less than the threshold, control the main processor to be powered off.

19. A near field communication (NFC) chip, wherein the NFC chip is located in a first terminal, the first terminal further comprises a main processor and a power management unit (PMU), and a first security element LSE is integrated into and/or a host-based card emulation (HCE) application runs on the main processor, and the NFC chip is configured to receive an application selection instruction sent by a second terminal, wherein the application selection instruction is used to instruct to process an NFC service by using an application in the first SE or the HCE application;

the NFC chip is further configured to: determine whether the main processor is powered off; and when the main processor is powered off, send a power-on trigger signal to the PMU, so that the PMU powers on and wakes up the main processor based on the power-on trigger signal; and the NFC chip is further configured to route the application selection instruction to the main processor, so that the main processor processes the NFC service;

the NFC chip is further configured to: when the first terminal further comprises a second SE, determine whether an application identifier (AID) carried in the application selection instruction is a preset AID; and when the AID is the preset AID, send the power-on trigger signal to the PMU, and the second SE and the main processor are independently configured.

20. The NFC chip according to claim 19, wherein
the NFC chip is further configured to send a time extension instruction to the second terminal, wherein the time extension instruction carries a to-be-extended duration, and the time extension instruction is used to instruct the second terminal to increase a waiting duration for communication, and the increased waiting duration is the to-be-extended duration.

* * * * *

UNITED STATES PATENT AND TRADEMARK OFFICE
CERTIFICATE OF CORRECTION

| | | |
|---|---|---|
| PATENT NO. | : 11,200,561 B2 | Page 1 of 1 |
| APPLICATION NO. | : 16/618515 | |
| DATED | : December 14, 2021 | |
| INVENTOR(S) | : Chang | |

It is certified that error appears in the above-identified patent and that said Letters Patent is hereby corrected as shown below:

In the Claims

In Column 22, Line 63, in Claim 1, delete "HCE" and insert -- (HCE) --.

In Column 24, Line 50, in Claim 10, delete "element" and insert -- element (SE) --.

In Column 26, Line 18, in Claim 19, delete "LSE" and insert -- SE --.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*